United States Patent
Zhang et al.

(10) Patent No.: US 12,075,401 B2
(45) Date of Patent: Aug. 27, 2024

(54) CONTROL METHOD FOR USER EQUIPMENT, CONTROL METHOD FOR BASE STATION, AND USER EQUIPMENT

(71) Applicants: SHARP KABUSHIKI KAISHA, Sakai (JP); FG Innovation Company Limited, Tuen Mun (HK)

(72) Inventors: Chongming Zhang, Shanghai (CN); Renmao Liu, Shanghai (CN)

(73) Assignees: SHARP KABUSHIKI KAISHA, Sakai (JP); FG Innovation Company Limited, New Territories (HK)

( * ) Notice: Subject to any disclaimer, the term of this patent is extended or adjusted under 35 U.S.C. 154(b) by 590 days.

(21) Appl. No.: 17/265,792

(22) PCT Filed: Aug. 9, 2019

(86) PCT No.: PCT/CN2019/099981
§ 371 (c)(1),
(2) Date: Apr. 26, 2021

(87) PCT Pub. No.: WO2020/034904
PCT Pub. Date: Feb. 20, 2020

(65) Prior Publication Data
US 2021/0258989 A1    Aug. 19, 2021

(30) Foreign Application Priority Data
Aug. 14, 2018    (CN) .......................... 201810926770.7

(51) Int. Cl.
*H04W 4/40*    (2018.01)
*H04W 72/02*    (2009.01)
(Continued)

(52) U.S. Cl.
CPC .......... *H04W 72/1263* (2013.01); *H04W 4/40* (2018.02); *H04W 72/02* (2013.01);
(Continued)

(58) Field of Classification Search
CPC ....... H04W 4/30–80; H04W 8/22–245; H04W 28/02–26; H04W 48/02–20;
(Continued)

(56) References Cited

U.S. PATENT DOCUMENTS

2016/0044707 A1    2/2016    Folke et al.
2017/0013640 A1    1/2017    Loehr et al.
(Continued)

FOREIGN PATENT DOCUMENTS

CN    102149080 A    8/2011
CN    106412794 A    2/2017
(Continued)

OTHER PUBLICATIONS

Huawei, HiSilicon, "Discussion on the questions in SA2 Ls on reliability for eV2X", R2-1801907, 3GPP TSG-RAN2 Meeting 101, Athens, Greece, Feb. 26-Mar. 2, 2018.
(Continued)

*Primary Examiner* — Timothy J Weidner
(74) *Attorney, Agent, or Firm* — ScienBiziP, P.C.

(57) ABSTRACT

The present disclosure provides a control method for a user equipment, a control method for a base station, and a user equipment. The control method for a user equipment comprises receiving scheduling request configuration information related to a sidelink; and performing a scheduling related to the sidelink based on the received scheduling request configuration information, wherein the scheduling request configuration information is received from at least a network side or a base station side and comprises a scheduling request configuration identity (ID) or specific scheduling request configuration.

12 Claims, 4 Drawing Sheets

(51) Int. Cl.
*H04W 72/0446* (2023.01)
*H04W 72/0453* (2023.01)
*H04W 72/1263* (2023.01)
*H04W 72/21* (2023.01)
*H04W 72/23* (2023.01)
*H04W 72/40* (2023.01)
*H04W 72/50* (2023.01)
*H04W 84/02* (2009.01)
*H04W 88/02* (2009.01)
*H04W 88/08* (2009.01)
*H04W 92/02* (2009.01)
*H04W 92/10* (2009.01)
*H04W 92/18* (2009.01)

(52) U.S. Cl.
CPC ... *H04W 72/0446* (2013.01); *H04W 72/0453* (2013.01); *H04W 72/21* (2023.01); *H04W 72/23* (2023.01); *H04W 72/40* (2023.01); *H04W 72/535* (2023.01); *H04W 84/02* (2013.01); *H04W 88/02* (2013.01); *H04W 88/08* (2013.01); *H04W 92/02* (2013.01); *H04W 92/10* (2013.01); *H04W 92/18* (2013.01)

(58) Field of Classification Search
CPC ......... H04W 72/02–569; H04W 74/002–0891; H04W 76/10–50; H04W 84/005–22; H04W 88/005–188; H04W 92/02–24
See application file for complete search history.

(56) References Cited

U.S. PATENT DOCUMENTS

| | | |
|---|---|---|
| 2017/0289733 A1 | 10/2017 | Rajagopal et al. |
| 2017/0318606 A1 | 11/2017 | Lee et al. |
| 2017/0325119 A1* | 11/2017 | Lee ..................... H04W 72/121 |
| 2018/0167966 A1 | 6/2018 | Dinan |
| 2018/0317123 A1* | 11/2018 | Chen ..................... H04W 72/21 |
| 2019/0007930 A1 | 1/2019 | Zhao et al. |
| 2021/0168814 A1* | 6/2021 | Chen ................. H04W 72/0453 |
| 2021/0168832 A1* | 6/2021 | Zhuo ..................... H04W 72/23 |

FOREIGN PATENT DOCUMENTS

| | | |
|---|---|---|
| CN | 107645774 A | 1/2018 |
| EP | 3397015 | 10/2018 |
| EP | 3639601 | 4/2020 |

OTHER PUBLICATIONS

NTT Docomo, New SID Proposal: Study on New Radio Access Technology, 3GPP TSG RAN Meeting #71 Goteborg, Sweden, Mar. 7-10, 2016, RP-160671.

Ericsson, Open issues for scheduling request, 3GPP TSG-RAN WG2 #100, Reno, US, Nov. 27-Dec. 1, 2017, R2-1713480, chapters 1, 2.2-2.6, 4, 5.4.4.

* cited by examiner

CONTROL METHOD FOR USER EQUIPMENT, CONTROL METHOD FOR BASE STATION, AND USER EQUIPMENT

FIELD

The present disclosure generally relates to wireless communications, and specifically, to methods related to the control method for user equipment, control method for base station and user equipment.

BACKGROUND

As mobile communication grows and its technology improves, the world is moving into a community that is a completely interconnected network and that is where anyone or anything can obtain information and share data at anytime and anywhere. It is estimated that there are 50 billion devices that are interconnected in 2020, and among those devices, only 10 billion devices are mobile phones and tablet computers. The rest are devices not communicating between humans but between each other. Therefore, how to design a system that better supports networks connecting all things requires more in-depth study and research.

Studies of the new 5G radio access technology were performed (referring to a non-patent publication: RP-160671 New SID Proposal: Study on New Radio Access Technology) in the #64 plenary meeting for RAN of the 3rd generation partnership program (3GPP) held in March 2016. In the work item, it is disclosed that frequency ranges in the future communication protocol may be expanded to 100 GHz while meeting the requirements of enhanced Mobile Broadband (cMBB), massive Machine-Type Communication (mMTC), and Ultra-Reliable and Low-Latency Communication (URLLC). The work item will be ended in 2018.

Vehicle-to-Everything (V2X) is a new generation communication technology that connects vehicles to everything, wherein V represents vehicle, X represents anyone that exchanges information with vehicle and, at present, it mostly includes vehicles, people, traffic roadside infrastructures and networks. V2X communication requests high requirements to latency and reliability.

Sidelink is a type of device-to-device (D2D) communication mode. The present LTD sidelink supports V2X communication. The sidelink that supports V2X communication may be called V2X sidelink. In the future NR technology, V2X communication will be supported. One way is to support LTD sidelink in an NR system, and another way is to build own sidelink. Via this two ways, NR system is able to realize the support to V2X communication.

When sidelink communication mode bears the V2X communication services, the side link has its specific side link logical channel. When data arrive on the sidelink logical channel of a user equipment (UE), it triggers UE to send a scheduling request at the Uu interface to inform the base station to configure resources of wireless interface for the sidelink communication, and, thereby, short-distance direct communications between vehicles, people and roads are performed.

In LTE systems, scheduling requests that are sent at the Uu interface are requests on the basis of universal scheduling request configuration. This means, regardless of which type of services arrives, the same scheduling request configuration is used. However, in NR systems, this has been improved. In NR systems, the UE sends scheduling requests at the Uu interface are configured based on logical channels. The base station, based on the priority of the logical channels, configures the corresponding scheduling request resources. With this, a higher priority service arrival triggers a scheduling request may use more effective scheduling request resources for sending scheduling requests. This allows the UE to timely report scheduling requests of high priority service and avoid latency caused by scheduling requests.

Therefore, in NR systems, when data arrive on the sidelink logical channel, the problem to be solved is which scheduling request configurations the triggered scheduling requests use. Especially, when the arrival data includes V2X service that requires low latency, how to effectively report scheduling requests is another problem that needs to be solved.

SUMMARY

The present disclosure seeks to provide solutions to the above problems, more specifically, the present disclosure provides control methods for UE, control methods for base station and UE.

According to a first aspect of the present disclosure, there is provided a control method for a user equipment, the method comprising: receiving scheduling request configuration information related to a sidelink; and performing a scheduling related to the sidelink based on the received scheduling request configuration information, wherein the scheduling request configuration information is received from at least a network side or a base station side and comprises a scheduling request configuration identity (ID) or a specific scheduling request configuration.

Preferably, the scheduling request confirmation information comprises the scheduling request configuration ID, and the scheduling request configuration ID is a scheduling request procedure configuration information ID or a scheduling request resource configuration information ID.

Preferably, when the scheduling request configuration ID is the scheduling request procedure configuration information ID, the scheduling request configuration information further comprises: a maximum allowable number of times for sending a scheduling request and a time during which sending the scheduling request is prohibited; and when the scheduling request configuration ID is the scheduling request resource configuration information ID, the scheduling request configuration information further comprises: the maximum allowable number of times for sending the scheduling requests, a time during which sending the scheduling request is prohibited, scheduling request periodicity and offset information, and Physical Uplink Control Channel (PUCCH) resource information.

Preferably, the scheduling request configuration information comprises the specific scheduling request configuration, and the specific scheduling request configuration is one or more scheduling request configurations, each comprising a maximum allowable number of times for a sending scheduling request, a time during which sending the scheduling request is prohibited, scheduling request periodicity and offset information, Physical Uplink Control Channel (PUCCH) resource information, and bandwidth part (BWP) related information.

Preferably, the scheduling request configuration information corresponds to each of a plurality of sidelink logical channel groups, or the scheduling request configuration information is provided according to each of a plurality of priorities included in a corresponding sidelink logical channel group.

Preferably, applying a scheduling request configuration selected based on the scheduling request configuration information to vehicle-to-everything (V2X) services when the V2X services exist; and using random access to perform a scheduling request for other services in a sidelink communication mode.

Furthermore, according to a second aspect of the present disclosure, there is provided a control method for a user equipment, the method comprising: receiving scheduling request Substitute specification clean configuration information from a network side or a base station side comprising a scheduling request configuration identity (ID) or a specific scheduling request configuration; selecting a scheduling request configuration related to a sidelink scheduling request according to at least one of a plurality of principles based on the received scheduling request configuration information; and performing a scheduling request related to the sidelink based on the selected scheduling request configuration, wherein the plurality of principles comprise: randomly selecting one scheduling request configuration from a plurality of scheduling request configurations; the selected scheduling request configuration corresponds to a scheduling request prohibit timer that is not active or running; the selected scheduling request configuration exists or corresponds to valid Physical Uplink Control Channel (PUCCH) resources; the selected scheduling request configuration corresponds to a logical channel priority that is equivalent to a sidelink logical channel priority; and the selected scheduling request configuration corresponds to a scheduling request resources that arrive the earliest.

Preferably, cancelling the scheduling request when the scheduling request is triggered, or prior to the scheduling request being triggered, if there is a pending scheduling request; and selecting the scheduling request if there is no pending scheduling request.

According to a third aspect of the present disclosure, there is provided a user equipment, comprising: a processor; and a memory storing instructions; wherein the instructions, when executed by the processor, performs a control method for a UE disclosed herein.

According to a fourth aspect of the present disclosure, there is provided a control method for a base station, the method comprising: forming scheduling request configuration information related to a sidelink; sending the scheduling request configuration information to a user equipment; and performing a scheduling request related to the sidelink based on the scheduling request configuration information, wherein the scheduling request configuration information comprises a scheduling request configuration identity (ID) or a specific scheduling request configuration.

DESCRIPTION

Figure 1:
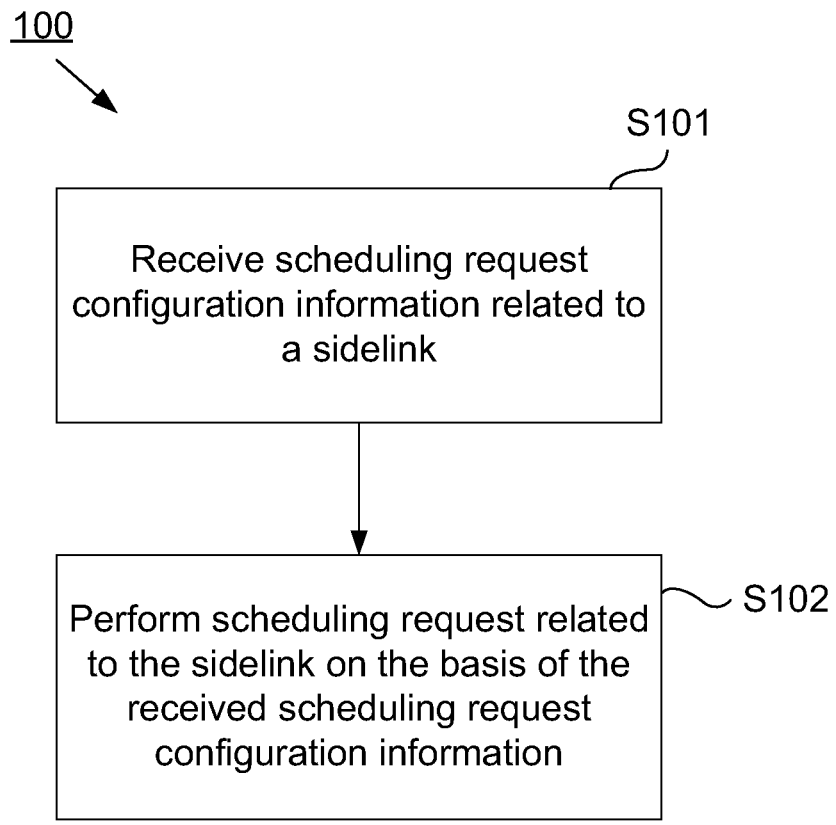
FIG. 1 is a flow chart of a control method 100 for a user equipment according to an implementation of the present disclosure.

The following descriptions and accompanying drawings contain detailed descriptions of exemplary implementations of the present disclosure. It should be appreciated that the present disclosure is not limited to the implementations disclosed herein. Additionally, for the ease of understanding, the descriptions do not include detailed descriptions of general knowledge not directly related to the present disclosure in order to avoid confusion of the present disclosure.

Prior to detailed descriptions of the implementations, the following paragraphs defines the terms used in the present disclosure. Unless otherwise specified, the terms in the present disclosure contain the following meanings.

| | |
|---|---|
| UE | User Equipment |
| NR | New Radio |
| Sidelink | Sidelink |
| V2X | Vehicle to Everything |
| BWP | Bandwidth Part |
| Sidelink BSR | Buffer Status Report for Sidelink |

The following paragraphs describes implementations applied in NR mobile communications systems and a progression environment. Base stations and UE supporting NR are used as examples to describe various implementations of the present disclosure. However, it should be noted that the present disclosure is not limited to the following implementations. The present disclosure is suitable for various other radio communications systems, such as an eLTE communications system. The present disclosure is also applicable to other base stations and UE.

[Sidelink BSR]

In order to provide a status of data for transmission in the sidelink buffer to the base station, the UE performs a sidelink BSR procedure.

When data arrive at the sidelink logical channel, if the arrived data corresponds to a logical channel that has a priority higher than other logical channels performing data transmission, or there is no data transmission at present, a sidelink BSR is formed.

Additionally, if the sidelink retransmission timer (retx-BSR-TimerSL) is time-out, any logical channels have data to be transmitted, a sidelink BSR is also formed.

If the UE does not have a sidelink BSR formed and sent by valid uplink resources, a scheduling request is triggered.

[Scheduling Request (SR)]

Scheduling requests are used to request the base stations for resources used in transmitting new data. When a SR is triggered, it may be seen as a pending SR until the SR is cancelled.

Scheduling requests may be transmitted on PUCCH. Therefore, for transmitting a scheduling request, a scheduling request resource configuration is needed, which comprises time and frequency information of the PUCCH resources used in transmitting the scheduling request, such as periodicity, offset and PRB etc.

In the procedure of transmitting a scheduling request, the UE activates a scheduling request prohibit timer (Sr-prohibittimer) for prohibiting UE sending scheduling request for a period of time and avoiding frequent sending of the scheduling requests. The UE tallies the number of times for sending scheduling request by recording a variable of SR-COUNTER. When the SR-COUNTER is less than a maximum allowable number of times for sending scheduling request (Sr-TransMax), the UE may continue to send scheduling requests. Once the SR-COUNTER is not less than Sr-TransMax, the UE may not send scheduling requests.

Therefore, the scheduling request procedure is configured with the following information:

Sr-prohibittimer-a time on a scheduling request prohibit timer;

Sr-TransMax-a maximum allowable number of times for sending scheduling request.

This type of scheduling request configuration information may be called scheduling request procedure configuration information (schedulingrequestconfig). To distinguish between different scheduling request procedure configuration information, each scheduling request procedure configuration information has its corresponding ID (schedulingRequestId).

In the logical channel configuration information, there may be comprised a scheduling request resource configuration information ID, so that the logical channel is linked with the Substitute specification-clean scheduling request procedure configuration information. The scheduling request configuration information may be called the scheduling request configuration information corresponded to the logical channel.

Furthermore, in the scheduling request resource configuration information (schedulingrequestresourceconfig), there may be comprised a scheduling request resource configuration information ID (schedulingRequestId), so that the scheduling request resource configuration information is linked with the scheduling request procedure configuration information.

Therefore, the UE may, by confirming scheduling request configuration information corresponded to a logical channel, confirm scheduling request resource configuration information corresponded to the scheduling request configuration information. Once the two information is confirmed, the scheduling request configuration information corresponded to the logical channel is confirmed. Therefore, the scheduling request configuration information that is confirmed in this way is considered as the scheduling request configuration information corresponded to the logical channel.

If the logical channel data arrival triggers a BSR which triggers a scheduling request, the UE uses the scheduling request configuration of the corresponded logical channel to send the corresponding scheduling request.

Furthermore, to distinguish between different scheduling request resource configuration information (schedulingrequestresourceconfig), each scheduling request resource configuration information has its corresponding ID (schedulingRequestResourceId).

In summary, one scheduling request configuration information (SR configuration) may comprise two part information: scheduling request resource configuration information (schedulingrequestresourceconfig) and scheduling request procedure configuration information (schedulingrequestconfig).

schedulingrequestconfig

```
SchedulingRequestConfig :: =                SEQUENCE {
    schedulingRequestToAddModList              SEQUENCE (SIZE (1..maxNrofSR-ConfigPerCellGroup)) OF
SchedulingRequestToAddMod    OPTIONAL, -- Need N
    schedulingRequestToReleaseList             SEQUENCE (SIZE (1..maxNrofSR-ConfigPerCellGroup) OF
SchedulingRequestId          OPTIONAL -- Need N
}
SchedulingRequest ToAddMod :: =             SEQUENCE {
    schedulingRequestId      SchedulingRequestId,
    sr-ProhibitTimer                           ENUMERATED {ms1, ms2, ms4, ms8, ms16, ms32, ms64, ms128}
                             OPTIONAL,        -- Need S
    sr-TransMax                                ENUMERATED { n4, n8, n16, n32, n64, spare3, spare2,
spare1 }
}
``` schedulingrequestresourceconfig

```
SchedulingRequestResourceConfig :: =  SEQUENCE {
    schedulingRequestResourceId       SchedulingRequestResourceId,
    schedulingRequestID               SchedulingRequestId,
    periodicityAndOffset              CHOICE {
        sym2                              NULL,
        sym6or7                           NULL,
        sl1                               NULL,           -- Recurs in every slot
        sl2                               INTEGER (0..1),
        sl4                               INTEGER (0..3),
        sl5                               INTEGER (0..4),
        sl8                               INTEGER (0..7),
        sl10                              INTEGER (0..9),
        sl16                              INTEGER (0..15),
        sl20                              INTEGER (0..19),
        sl40                              INTEGER (0..39),
        sl80                              INTEGER (0..79),
        sl160                             INTEGER (0..159),
        sl320                             INTEGER (0..319),
        sl640                             INTEGER (0..639)
    }
    resource                          PUCCH-ResourceId
}
```

Wherein, the schedulingrequestresourceconfig is included in PUCCH-config.

```
PUCCH-Config ::=                          SEQUENCE {
schedulingRequestResourceToAddModList       SEQUENCE (SIZE (1..maxNrofSR-Resources)) OF
SchedulingRequestResourceConfig  OPTIONAL, -- Need N
schedulingRequestResourceToReleaseList      SEQUENCE (SIZE (1..maxNrofSR-Resources)) OF
SchedulingRequestResourceId       OPTIONAL, -- Need N
```

Each PUCCH-config is configured based on BWP, so schedulingrequestresourceconfig is also configured based on BWP. The PUCCH resources included in schedulingrequestresourceconfig relates to the PUCCH resources on the BWP that belong to the schedulingrequestresourceconfig, not any PUCCH resources on the BWP.

Each SR configuration has a corresponding variable SR_COUNTER. If a SR is triggered and there is no SR configuration from other pending SR that corresponds to the same SR configuration as this triggered SR, the UE sets SR_COUNTER to 0.

In SR transmission time, only the PUCCH resources configured on active BWP are considered to be valid resources.

Specifically for a pending SR, if there is no valid PUCCH resources configured to the SR, the UE performs a random access procedure on SPcell and cancels this pending SR.

If there is valid PUCCH, for the SR configuration corresponded to this pending SR, if the variable SR_COUNTER is less than sr-TransMax and the sr-ProhibitTimer is not running during SR transmission time, then the UE instructs the physical layer to send a SR signal on PUCCH resource that is valid for SR use and activates the sr-ProhibitTimer.

In the present disclosure, the terms "related," "relating," "corresponded," and "corresponding" are interchangeable.

In the present disclosure, the terms "sidelink" and "V2X sidelink" are interchangeable.

In the present disclosure, the configuration information that is not related to a sidelink is directed to the configuration information provided for realizing communication between the UE and the base station at the Uu interface, and it may also be called universal configuration information. The configuration information that is related to a sidelink is directed to the configuration information provided for realizing sidelink communications.

The following paragraphs disclose a control method of a user equipment of the present disclosure in detail, more specifically, a scheduling request control method for sidelink related to a user equipment.

In one example, FIG. 1 is a flow chart of a control method 100 for a user equipment according to an implementation of the present disclosure.

At step S101, a user equipment receives scheduling request configuration information related to a sidelink and sent by a network side and/or a base station side.

Wherein, the scheduling request configuration information related to the sidelink and sent by the network side and/or the base station side may comprise a scheduling request configuration ID or a specific scheduling request configuration. For example, when the scheduling request configuration information includes a scheduling request configuration ID, the scheduling request configuration ID may be a scheduling request procedure configuration information ID (schedulingRequestID) or a scheduling request resource configuration information ID (schedulingRequestResourceId). Additionally, for example, when the scheduling request configuration information includes a specific scheduling request configuration, the specific scheduling request configuration may be one or more specific scheduling request configurations, each of the scheduling request configuration comprises: a maximum allowable number of times for sending scheduling request, a time during which sending the scheduling request is prohibited, scheduling request periodicity and offset information, PUCCH resource information, and bandwidth part (BWP) related information.

Furthermore, when the above scheduling request configuration ID is the scheduling request procedure configuration information ID, the scheduling request configuration information may comprise: a maximum allowable number of times for sending scheduling request and a time during which sending the scheduling request is prohibited. When the above scheduling request configuration ID is the scheduling request resource configuration information ID, the scheduling request configuration information may comprise: a maximum allowable times for sending scheduling requests, a time during which sending the scheduling request is prohibited, scheduling request periodicity and offset information, and PUCCH resource information.

At step S102, the UE performs scheduling requesting related to the sidelink on the basis of the received scheduling request configuration information.

Figure 2:
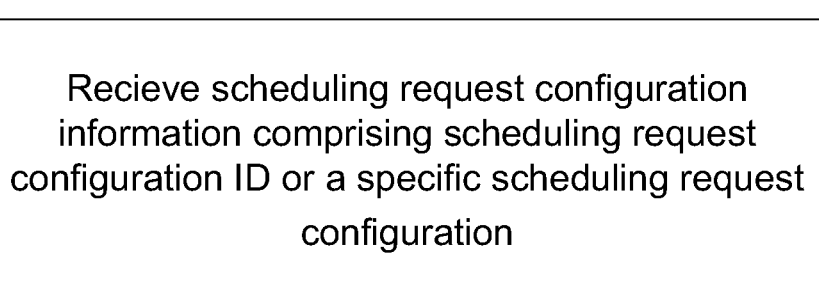
FIG. 2 is a flow chart of a control method 200 for a user equipment according to an implementation of the present disclosure.
Figure 2:
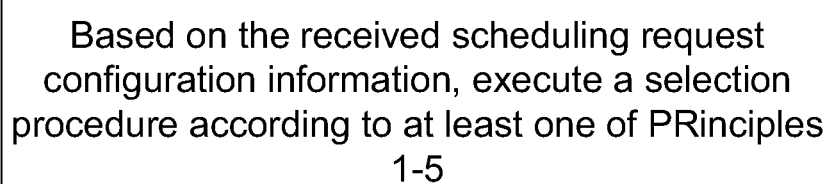
Figure 2:
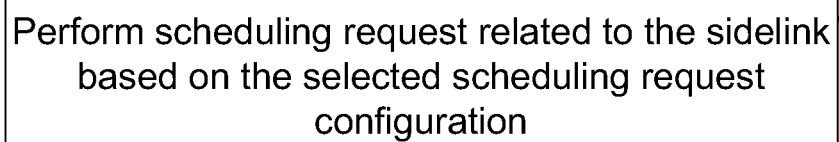

Moreover, FIG. 2 is a flow chart of a control method 200 for a user equipment according to an implementation of the present disclosure.

At step S201, a user equipment receives scheduling request configuration information sent by a network side and/or a base station side comprising a scheduling request configuration ID or a specific scheduling request configuration. Wherein, the scheduling request configuration ID may be a scheduling request procedure configuration information ID or a scheduling request resource configuration information ID. In addition, the specific scheduling request configuration may be one or more specific scheduling request configurations.

At step S202, the user equipment, based on the received scheduling request configuration information, executes a selection procedure according to at least one of the following principles. With the above selection procedure, the user equipment selects a scheduling request configuration related to a sidelink scheduling request.

The above principles comprise: Principle 1, randomly select one scheduling request configuration from all scheduling request configurations in the user equipment; Principle 2, the selected scheduling request configuration corresponds to a scheduling request prohibit timer that is not active or running; Principle 3, the selected scheduling request configuration exists or corresponds to valid PUCCH resources; Principle 4, the selected scheduling request configuration corresponds to a logical channel priority that is equivalent to a sidelink logical channel priority; and Principle 5, the selected scheduling request configuration corresponds to a scheduling request resources that arrive the earliest.

At step S203, the user equipment performs a scheduling request related to the sidelink based on the selected scheduling request configuration.

The following paragraphs disclose a control method of a base station of the present disclosure in detail. More specifically, the following paragraphs disclose a scheduling request control method for a sidelink related to a base station.

Figure 3:
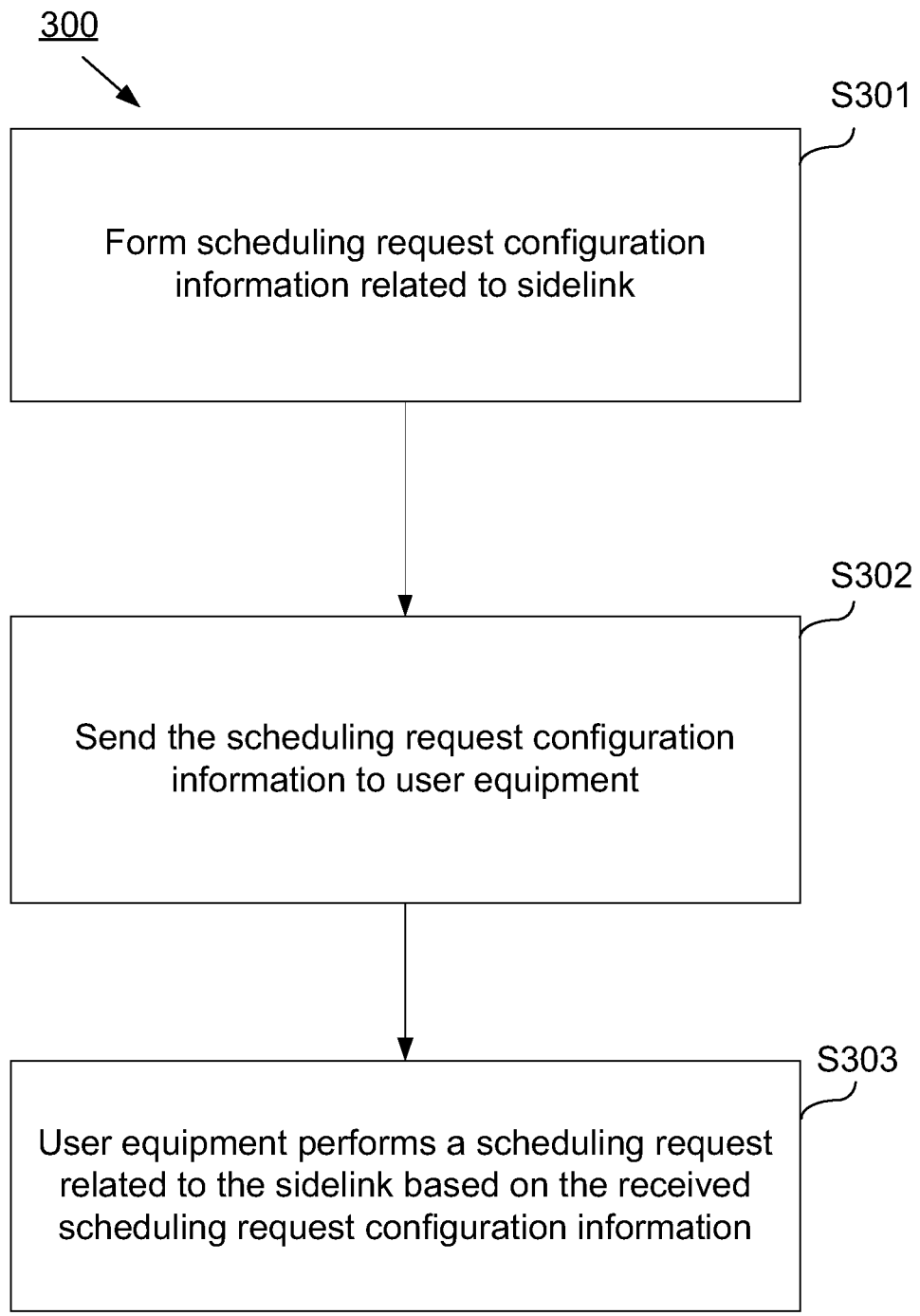
FIG. 3 is a flow chart of a control method 300 for a base station according to an implementation of the present disclosure.

In one example, FIG. 3 is a flow chart of a control method 300 for a base station to an implementation of the present disclosure.

At step S301, a base station forms scheduling request configuration information related to a sidelink. Wherein, the scheduling request configuration information may comprise a scheduling request configuration ID or a specific scheduling request configuration. The content of the scheduling request configuration information is the same as the scheduling request configuration information disclosed in the control method 100 with reference to FIG. 1, so the descriptions of such is not repeated here.

At step S302, the base station sends the scheduling request configuration information to a user equipment.

Subsequently, at step S303, the user equipment performs a scheduling request related to the sidelink based on the received scheduling request configuration information.

The following disclosure provides detailed explanations to the implementations of the present disclosure. Furthermore, as stated previously, the implementations of the present disclosure are provided as exemplary implementations for the ease of understanding. The present disclosure is not limited to the implementations disclosed herein.

Implementation 1

The UE receives configuration information from a network side or a base station side. The configuration information includes configuration information related to a sidelink or a V2X sidelink. It also includes information related to scheduling configuration.

For example, the UE receives reconfiguration information from a network side or a base station side, which includes configuration information related to the sidelink, such as SL-CommConfig, wherein common transmitting resources configuration (commTxResources) is included for sidelink transmission. If the common transmitting resources is set to a scheduling mode, then it also includes the configuration information related to scheduling request, and is used in scheduling request. Here, the configuration information related to scheduling request may be selected according to the following methods.

Option 1: the configuration information related to scheduling request may include a scheduling request configuration ID.

The scheduling request configuration ID may be the scheduling request configuration ID as disclosed previously, or the scheduling request resource configuration ID as disclosed previously.

Wherein, a specific configuration information corresponded to the scheduling request configuration ID is included in a universal configuration information, which means it is included in configuration information not related to a sidelink. The scheduling request configuration information includes scheduling request configuration information IDs. This allows the UE to identify the unique scheduling request configuration information corresponded to each ID.

Therefore, when the UE receives one or more scheduling request configuration information IDs in the configuration information related to the sidelink, the UE may identify the scheduling request configuration information corresponded to each respective ID, and use it in a SR procedure triggered by a sidelink BSR.

when the scheduling request configuration ID is the scheduleRequestID as disclosed above, the UE is configured with the following information in practice:

Information 1: a maximum allowable number of times for sending scheduling request. This information is used in a scheduling request procedure. In the scheduling request procedure that has used the scheduling request configuration, this information defines a maximum allowable number of times for sending scheduling request.

Information 2: a time during which sending the scheduling request is prohibited. After the UE sends a scheduling request, it activates a scheduling request prohibit timer to avoid frequent sending of scheduling requests. In the scheduling request procedure that has used the scheduling request configuration, the time on scheduling request prohibit timer us set to be the time on prohibiting sending of scheduling request indicated in the scheduling request configuration information.

The information related to PUCCH resources used in transmitting scheduling request does not have an explicit configuration. The UE may, based on configured schedulingRequestID, confirm the PUCCH resources used in sending scheduling requests triggered by sidelink BSRs. Specifically, it may be that, on a currently active/operating BWP, the UE determines/detects if there exists a SchedulingRequestResourceConfig including a configured shedulingRequestID inside a SchedulingRequestResourceConfig included in a configured PUCCH.

If there exists a SchedulingRequestResourceConfig including a configured shedulingRequestID, the PUCCH resources configured in the SchedulingRequestResourceConfig may be used for sending scheduling requests triggered by sidelink BSRs.

If there exists no SchedulingRequestResourceConfig like such, it may be considered as the UE does not have valid PUCCH resources for sending scheduling requests triggered by sidelink BSRs. The UE may select scheduling request configuration or PUCCH resources as disclosed in Implementation 4. The UE may also trigger a random access procedure, and preferably, cancel the pending SR.

when the scheduling request configuration ID is the scheduleRequestResourceID as disclosed above, the UE is configured with the following information in practice:

Information 1: a maximum allowable number of times for sending scheduling request. This information is used in a scheduling request procedure. In the scheduling request procedure that has used the scheduling request configuration, this information defines a maximum allowable number of times for sending scheduling request.

Information 2: a time during which sending the scheduling request is prohibited. After the UE sends a scheduling request, it activates a scheduling request prohibit timer to avoid frequent sending of scheduling requests. In the scheduling request procedure that has used the scheduling request configuration, the time on scheduling request prohibit timer us set to be the time on prohibiting sending of scheduling request indicated in the scheduling request configuration information.

Information 3: Scheduling request periodicity and offset.

Information 4: PUCCH resources including PRB information and PUCCH format information etc.

The above disclosed information may be used to confirm resources of sending PUCCH, and the timer configuration and the maximum sending time configuration in the sending procedure.

The schedulingRequestResourceId may correspond to one SchedulingRequestResourceConfig. However, because the SchedulingRequestResourceConfig is included in the PUCCH-config and the PUCCH-config configures for each BWP, the SchedulingRequestResourceConfig also configures for each BWP. Therefore, if the UE only receives a schedulingRequestResourceId in the sidelink configuration, it cannot be confirmed which BWP configured SchedulingRequestResourceConfig on the network side that this schedulingRequestResourceId corresponds to. To confirm the SchedulingRequestResourceConfig the schedulingRequestResourceId corresponds to, a method is proposed. The method is to provide BWP related information, such as BWP ID, at the same time as providing schedulingRequestResourceId information at a network side. Since the network side may provide UE with information to configure multiple BWP in the configuration information unrelated to the sidelink and these BWP correspond to BWP IDs, with the BWP ID, the UE can uniquely confirm which BWP and further confirm the SchedulingRequestResourceConfig that the provided schedulingRequestResourceId corresponds to.

Since not all BWP are activated at any time, the UE may only send scheduling requests on activated BWP. When the sidelink BSR triggers a SR, the UE may confirm SchedulingRequestResourceConfig based on BWP ID and schedulingRequestResourceId, and further confirm the PUCCH resources for sending the scheduling request and the timer and maximum sending time configurations. However, the UE still needs to determine if the BWP that PUCCH resources belong to is active or is in operation by the UE. If the BWP that the PUCCH resources or SchedulingRequestResourceConfig belong to is not active or in operation, then the UE may be considered to have no valid PUCCH resources for sending the scheduling request triggered by the sidelink BSR. The UE may select scheduling request configuration or PUCCH resources as disclosed in Implementation 4. The UE may also trigger a random access procedure, and preferably, cancel the pending SR.

Option 2: the configuration information related to scheduling request may include a specific scheduling request configuration. The network side may provide one or more groups of scheduling request configuration, each configuration comprises the above disclosed Information 1 to Information 4 and the BWP related information.

By using this method, the configuration of a scheduling request triggered by a sidelink BSR may be completely different to a scheduling request not triggered by a sidelink BSR. This allows the management of scheduling requests triggered by a sidelink BSR to be more flexible.

Particularly, regardless the configuration information is instructed with Option 1 or Option 2, in an actual configuration procedure, the configuration information may be defaulted. When the configuration information related to the scheduling request is defaulted, the UE may select a suitable configuration based on the existing scheduling request configuration (which is the configuration related to scheduling request in the configuration unrelated to the sidelink provided by the network side). The selection method is disclosed in detail in Implementation 4.

Implementation 2

The difference between Implementation 1 and Implementation 2 is that the network side provides the scheduling request configuration information based on the sidelink logical channel group.

In the configuration information related to the sidelink sent by the network side, it may comprise information related to the sidelink logical channel group, such as logicalChGroupInfoList. This cell provides the information related to logical channel group priority according to the ascending (or descending) numbering of the logical channel group.

logicalChGroupInfoList

| LCG index | PRIORITY |
|---|---|
| LCG 1 | PRIORITYlist-1 Priority-1 Priority-2 |
| LCG 2 | PRIORITYlist-2 Priority-3 Priority-4 |
| LCG 3 | PRIORITYlist-3 Priority-5 |

LogicalChGroupInfoList:: =SEQUENCE(SIZE(1 . . . maxLCG))OF SL-PriorityList
SL-PriorityList cell

```
-- ASN1START
SL-priorityList ::=    SEQUENCE (SIZE
                       (1..maxSL-Prio-r13)) OF SL-Priority
SL-Priority ::=        INTEGER (1..8)
-- ASN1STOP
```

The network side may provide the logical channel group priority information, and, at the same time, provide scheduling request configuration information for each logical channel group. The specific implementation of the configuration information is referred to in Option 1 and Option 2 in Implementation 1.

This scheduling request configuration information as provided may be called the scheduling request configuration information corresponding to/related to the logical channel group.

The specific configuration method may be that, in an example, the network side provides a schedulingrequestID as the scheduling request configuration information.

The logicalChGroupInfoList, in the list, each row of information comprises a schedulingrequestID. Since each row in the logicalChGroupInfoList corresponds to a logical channel group, the schedulingrequestID comprised in each row may be considered to correspond to the scheduling request configuration information that corresponds to the logical channel group.

logicalChGroupInfoList carrying scheduling request configuration

| LCG index | PRIORITY | Scheduling request configuration |
|---|---|---|
| LCG 1 | PRIORITYlist-1 Priority-1 Priority-2 | SchedulingrequestID-1 |
| LCG 2 | PRIORITYlist-2 Priority-3 Priority-4 | SchedulingrequestID-2 |
| LCG 3 | PRIORITYlist-3 Priority-5 | SchedulingrequestID-3 |

LogicalChGroupInfoList:: =SEQUENCE(SIZE(1 . . . maxLCG))OF Information-1
Information-1

```
-- ASN1START
Information-1 ::=       SEQUENCE {
SL-PriorityList
SchedulingRequest       SchedulingRequestID
}
-- ASN1STOP
```

The network side may also provide a SR configuration information list in a new cell, for example SRconfigInfoList. The list provides a schedulingrequestID to every row with contents according to the ascending numbering of the logical channel group. Since each row of the SRconfigInfoList corresponds to a logical channel group, the schedulingrequestID of each row corresponds to its respective scheduling request configuration, or the scheduling request configuration included in each row may be called the scheduling request configuration information corresponded to the logical channel group.

SRconfigInfoList

TABLE 0001

| LCG index | Scheduling request configuration |
|---|---|
| LCG 1 | SchedulingrequestID-1 |
| LCG 2 | SchedulingrequestID-2 |
| LCG 3 | SchedulingrequestID-3 |

SRconfigInfoList:: =SEQUENCE(SIZE(1 . . . maxLCG)) OF SL-SchedulingRequest
SL-SchedulingRequest cell

```
-- ASN1START
SL-SchedulingRequest ::=        SEQUENCE {
SchedulingRequest               SchedulingRequestID
}
-- ASN1STOP
```

Since the sidelink BSR is triggered by data arrival on some sidelink logical channel, and the logical channel belongs to some logical channel group, it may be determined that the logical channel group triggers the sidelink BSR, or the logical channel group corresponds to the sidelink BSR. Therefore, in the scheduling request procedure triggered by the sidelink BSR, the scheduling request configuration information that corresponds to this sidelink BSR triggered by the logical channel group may be used.

Regardless, in the logicalChGroupList or the SRconfig-InfoList, if the scheduling request configuration provided in the row is defaulted, or the logical channel group does not have a corresponding scheduling request configuration, then the logical channel group may use the scheduling request configuration provided to the previous logical channel group, or use the scheduling request configuration provided to the subsequent logical channel group.

The terms "the previous" or "the subsequent" disclosed herein may refer to a sequence of the logical channel group numbers. It may refer to the logical channel group whose number is less than the current logical channel group number, but closest to the current logical channel group number. It may refer to the logical channel group whose number is larger than the current logical channel group number, but closest to the current logical channel group number.

Additionally, when the scheduling request configuration corresponded to the logical channel group is defaulted, the UE may still select a scheduling request configuration itself. The selection method is disclosed in detail in Implementation 4.

Particularly, when the sidelink retransmission timer (retx-BSR-TimerSL) is time-out, with data to be transmitted on any sidelink logical channel, a sidelink BSR is formed and the sidelink BSR also triggers a scheduling request. In this circumstance, a scheduling request configuration may be selected based on the logical channel group in the sidelink BSR whose buffer value is not null or is not zero, and the scheduling request configuration is used to trigger a scheduling request. If there are multiple logical channel groups whose buffer value is not null or is not zero, the logical channel group with the highest priority among the priorities included in all logical channel groups is selected, and the corresponding scheduling request configuration is selected to trigger the scheduling request.

Implementation 3

The difference between Implementation 2 and Implementation 3 is that the scheduling request configuration information is provided based on the priority information included in the logical channel group.

The network side assigns one or more priorities for each logical channel group, and the UE may associate the priorities to the logical channel group itself. Therefore, the network side may provide a scheduling request configuration information corresponded to each priority at the same time as the network side assigns one or more priorities for each logical channel group. The scheduling request configuration information may be called the scheduling request configuration corresponded to the priority.

logicalChGroupInfoList carrying scheduling request configuration

| LCG index | PRIORITY | Scheduling request configuration |
|---|---|---|
| LCG 1 | PRIORITYlist-1 | |
| | Priority-1 | SchedulingrequestID-1 |
| | Priority-2 | SchedulingrequestID-2 |
| LCG 2 | PRIORITYlist-2 | |
| | Priority-3 | SchedulingrequestID-3 |
| | Priority-4 | SchedulingrequestID-4 |
| LCG 3 | PRIORITYlist-3 | |
| | Priority-5 | SchedulingrequestID-5 |

LogicalChGroupInfoList:: =SEQUENCE(SIZE(1 . . . maxLCG))OF SL-priorityList
SL-PriorityList cell carrying scheduling request configuration

```
-- ASN1START
SL-priorityList ::=     SEQUENCE (SIZE
                        (1..maxSL-Prio)) OF Information-2
-- ASN1STOP
```

Information-2

```
-- ASN1START
Information-2 ::=       SEQUENCE {
Priority                INTEGER (1..8)
SchedulingRequest       SchedulingRequestID
}
-- ASN1STOP
```

Since the sidelink BSR is triggered by data arrival on some sidelink logical channel, and the logical channel is associated with some priority, it may be determined that the scheduling request configuration used in the scheduling request procedure triggered by the sidelink BSR is a scheduling request configuration with a priority that corresponds to the priority of the logical channel, so that the logical channel of the sidelink BSR is triggered. In another word, when a logical channel with a corresponding priority triggers a sidelink BSR due to data arrival and subsequently triggers a scheduling request, the scheduling request uses a scheduling request configuration that corresponds to the priority of the logical channel.

Similarly, when the scheduling request configuration corresponded to the priority is defaulted, the UE may select a scheduling request configuration itself. The selection method is disclosed in detail in Implementation 4.

Particularly, when the sidelink retransmission timer (retx-BSR-TimerSL) is time-out, with data to be transmitted on any sidelink logical channel, a sidelink BSR is formed and the sidelink BSR also triggers a scheduling request. In this circumstance, a scheduling request configuration may be selected based on the logical channel group with highest priority in the sidelink BSR whose buffer value is not null or is not zero, and the scheduling request configuration is used to trigger a scheduling request. If there are multiple logical channel groups whose buffer value is not null or is not zero, the logical channel group with the highest priority among the priorities included in all logical channel groups is selected, and the corresponding scheduling request configuration is selected to trigger the scheduling request.

Implementation 4

Implementation 4 discloses the principles and procedures of the user equipment selecting scheduling request configuration in detail.

When a sidelink BSR triggers a scheduling request, the UE may select a scheduling request configuration used in the scheduling request procedure.

In the selection procedure, the UE performs the selection according to one or more of the following principles.

Principle 1-randomly select one scheduling request configuration from all scheduling request configurations in the user equipment for the scheduling request triggered by the sidelink BSR.

As disclosed, the scheduling request configurations in the user equipment may comprise the following information:

Information 1: a maximum allowable number of times for sending scheduling request. This information is used in a scheduling request procedure. In the scheduling request procedure that has used the scheduling request configuration, this information defines a maximum allowable number of times for sending scheduling request.

Information 2: a time during which sending the scheduling request is prohibited. After the UE sends a scheduling request, it activates a scheduling request prohibit timer to avoid frequent sending of scheduling requests. In the scheduling request procedure that has used the scheduling request configuration, the time on scheduling request prohibit timer us set to be the time on prohibiting sending of scheduling request indicated in the scheduling request configuration information.

Information 3: Scheduling request periodicity and offset.

Information 4: PUCCH resources including PRB information and PUCCH format information etc.

Wherein, Information 1 and Information 2 are included in schedulingrequestconfig; Information 3 and Information 4 and the index schedulingRequestId corresponded to Information 1 and Information 2 (i.e. corresponded to schedulingrequestconfig) are included in schedulingrequestresourceconfig; and the index of schedulingrequestresourceconfig is schedulingRequestResourceId. Moreover, schedulingrequestresourceconfig is related to BWP, and each BWP has its corresponding schedulingrequestresourceconfig.

The UE may perform the following processing methods when selecting based on the content of selection.

Method 1:

The content of selection for the UE is schedulingrequestconfig, or schedulingRequestId corresponded to schedulingrequestconfig. This means that the UE selects a configuration information including at least Information 1 and Information 2.

The UE may randomly select from the existing schedulingrequestconfig, but the UE needs to further confirm PUCCH resources for sending scheduling request. Otherwise, even the schedulingrequestconfig is selected, it is possible that sending scheduling request on PUCCH cannot be performed as there is no valid PUCCH resources on the BWP currently in operation.

Therefore, the UE may confirm a range of selection. The schedulingRequestId selected by the UE should be included in the PUCCH resources on the BWP that is currently active/in operation for the UE. More specifically, the schedulingRequestId is included in the SchedulingRequestResourceConfig of the PUCCH configuration. It also means that the UE randomly selects a schedulingRequestId from the schedulingRequestId(s) included in the SchedulingRequestResourceConfig which is included in the PUCCH resources on the BWP that is currently active/in operation.

Method 2:

The content of selection for the UE is SchedulingRequestResourceConfig, or schedulingRequesResourcetId corresponded to SchedulingRequestResourceConfig. This means that the UE selects a configuration information including at least Information 1, 2, 3 and 4.

The UE selects a SchedulingRequestResourceConfig from the existing SchedulingRequestResourceConfig.

Considering the SchedulingRequestResourceConfig is configured based on the BWP, preferably, the UE may select from the SchedulingRequestResourceConfig included in the PUCCH configurations on the BWP that is currently active/in operation.

The selected SchedulingRequestResourceConfig or schedulingrequestconfig may be considered to be the scheduling request configuration corresponded to the scheduling request triggered by the sidelink BSR, and be used in the subsequent scheduling request procedure(s).

Principle 2—the selected scheduling request configuration corresponds to a scheduling request prohibit timer that is not active or running, preferably, the variable SR_COUNTER is less than sr-TransMax.

The selected scheduling request configuration may have been used by other scheduling request procedures. For example, Logical Channel 1 has a corresponding Scheduling Request Configuration 1. When data arrives on Logical Channel 1, a BSR is formed and a scheduling request is triggered. The scheduling request uses the scheduling request configuration corresponded to Logical Channel 1, the variable SR-COUNTER starts counting, and sr-ProhibitTimer may be running or time-out and stopped.

If sr-ProhibitTimer is running, then Scheduling Request Configuration 1 should not be selected for the scheduling request triggered by the sidelink BSR. This is because when sr-ProhibitTimer is running, the UE cannot send a scheduling request based on Scheduling Request Configuration 1, and the UE is prohibited from sending scheduling requests on the PUCCH resources corresponded to Scheduling Request Configuration 1.

If sr-ProhibitTimer is stopped, then Scheduling Request Configuration 1 may be selected for the scheduling request triggered by the sidelink BSR.

Preferably, if the value of SR_COUNTER is not less than sr-TransMax, this means that the sending of the scheduling requests of Scheduling Request Configuration 1 has reached the maximum allowable number of times and the UE is not allowed to send any more scheduling requests. Therefore, Scheduling Request Configuration 1 should not be selected for the scheduling requests triggered by the sidelink BSR.

If the value of SR_COUNTER is less than sr-TransMax, this means that the scheduling requests of Scheduling Request Configuration 1 may continue to be sent and Scheduling Request Configuration 1 may be selected for the scheduling requests triggered by the sidelink BSR.

If there exists Scheduling Request Configuration 2 that corresponds to Logical Channel 2 and Logical Channel 2 has not trigger any scheduling requests, then it is considered that sr-ProhibitTimer that corresponds to Scheduling Request Configuration 2 is not activated and SR_COUNTER is less than sr-TransMax. The UE may select the scheduling request configuration 2.

Principle 3—the selected scheduling request configuration exists or corresponds to valid PUCCH resources.

Said valid PUCCH resources refer to the PUCCH resources configured on the BWP that is currently active/in operation. The scheduling request configuration selected by the UE should be in association with valid PUCCH resources.

The content of selection for the UE is schedulingrequestconfig, or schedulingRequestId corresponded to schedulingrequestconfig. This means that the UE selects a configuration information including at least Information 1 and Information 2. In this circumstance, there are PUCCH resources on the BWP that is currently active/in operation associated with the schedulingrequestconfig. The specific association method may be to include a schedulingRequestId of the schedulingrequestconfig in the SchedulingRequestResourceConfig configured on the currently active/in-operation BWP.

If the content of selection for the UE is SchedulingRequestResourceConfig, or schedulingRequesResourcetId corresponded to SchedulingRequestResourceConfig. This means that the UE selects a configuration information including at least Information 1, 2, 3 and 4. In this circumstance, the selected SchedulingRequestResourceConfig is configured on the BWP that is currently active/in operation. The specific association method may be to include the PUCCH resources configured on current BWP in the SchedulingRequestResourceConfig.

Principle 4—the selected scheduling request configuration corresponds to a logical channel priority that is equivalent to a sidelink logical channel priority.

The "sidelink logical channel" disclosed herein is the logical channel triggered by a sidelink BSR and the selected scheduling request configuration is used in the scheduling request triggered by the sidelink BSR.

Herein, the logical channel corresponded to the selected scheduling request configuration refers to the logical channel that uses the scheduling request configuration, which is the scheduling request configuration in association with the logical channel. The specific association method may be to include the scheduling request configuration ID in the logical channel configuration. The logical channel is a non-sidelink logical channel, and the logical channel corresponds to a priority. If there are multiple logical channels that use the SR configuration, and the priorities of these logical channels are different, then the highest, the lowest or the medium priority may be selected as the corresponding logical channel priority of the scheduling request configuration.

Sidelink logical channel priority: the logical channel disclosed herein refers to the sidelink logical channel that triggers scheduling requests, and the priority that logical channel corresponds to. Wherein, the sidelink logical channel that triggers scheduling requests refers to data arriving at the logical channel and triggering a sidelink BSR, and the sidelink BSR further triggering a scheduling request. Therefore the sidelink logical channel is called the sidelink logical channel that triggers scheduling requests. The UE associates the corresponding priority with the sidelink logical channel.

The "equivalent priority" disclosed herein may refer to two priorities being the same, or the differences between the two priorities does not exceed a certain value, or is not less than a certain value.

Alternatively, the priority of the sidelink logical channel may be compared to all logical channel priorities, the logical channel with a corresponding priority that has the smallest difference to the priority is selected.

For example, Logical Channel 1 has a priority of 3 and the corresponding scheduling request configuration is Scheduling Request Configuration 1; Logical Channel 2 has a priority of 5 and the corresponding scheduling request configuration is Scheduling Request Configuration 2; and the Sidelink Logical Channel 3 has a priority of 3.

As data arrive at Sidelink Logical Channel 3, a sidelink BSR is formed which triggers a scheduling request. Since Sidelink Logical Channel 3 has a priority that is the same is the priority of Logical Channel 1, they are both 3, the UE selects the scheduling request configuration corresponded to Logical Channel 1, which is Scheduling Request Configuration 1, as the scheduling request configuration for scheduling requests triggered by Sidelink Logical Channel 3. The UE does not select Scheduling Request Configuration 2 of Logical Channel 2 because Logical Channel 2 has a priority that is different to the priority of Sidelink Logical Channel 3. If the priority of Logical Channel 1 is 4, the UE still selects Scheduling Request Configuration 1 in this circumstance. This is because the priority difference between Logical Channel 1 and Sidelink Logical Channel 3 is 1, which is less than the priority difference between Logical Channel 2 and Sidelink Logical Channel 3. Therefore, the scheduling request configuration that corresponds to the logical channel with the smallest difference is selected.

Particularly, when the sidelink retransmission timer (retxBSR-TimerSL) is time-out, with data to be transmitted on any sidelink logical channel, a sidelink BSR is formed and the sidelink BSR also triggers a scheduling request. In this circumstance, a scheduling request configuration with equivalent priority may be selected based on the logical channel group with highest priority in the sidelink BSR whose buffer value is not null or is not zero, and the scheduling request configuration is used to trigger a scheduling request. If there are multiple logical channel groups whose buffer value is not null or is not zero, the logical channel group with the highest priority among the priorities included in all logical channel groups is selected.

Principle 5—the selected scheduling request configuration corresponds to a scheduling request resources that arrive the earliest.

As the scheduling request resource configuration includes SR configuration that corresponds to the SR configuration, the arrival time of the scheduling request resource is earlier than the arrival time of scheduling request resource from the scheduling request resource configuration including other SR configuration. This means that the UE may send the scheduling request as soon as it can. This Principle actually inherently implies that the scheduling request resource PUCCH that corresponds to the selected scheduling request configuration must be a valid PUCCH as disclosed in Principle 3. While viewing from the aspect of time, the valid PUCCH resource arrives the earliest.

The above disclosed Principles may be used in combination. For example, combining Principle 1 and Principle 2, when there are multiple scheduling request configurations that satisfy the requirement of Principle 2 to be chosen from, Principle 1 may be combined so that the UE may randomly select one scheduling request configuration. In another example, combining Principle 3 and 5, the UE selects the scheduling request configuration that corresponds to the earliest arriving and most effective PUCCH resource. When applying the above Principles, there may not be of any sequence relation.

The selected scheduling request configuration may be considered to be the scheduling request configuration corresponded to the scheduling request triggered by the sidelink BSR, and be used in the subsequent scheduling request procedure(s).

Based on the selected scheduling request configuration, when sending the SR triggered by the sidelink BSR, the UE uses the maximum number of times for sending included in the scheduling request configuration to set the maximum number of times for sending of the scheduling request; the UE uses the time on the prohibiting sending of scheduling request timer included in the scheduling request configuration to set the time on the prohibiting sending of scheduling request timer of the SR.

Implementation 5

Implementation 5 is different to Implementation 4 in that, when a sidelink BSR triggers a SR and the SR is being triggered or prior to the SR is triggered, if there exists a pending SR, preferably, the pending SR is not triggered by the sidelink BSR and the SR triggered by the sidelink BSR may be canceled. If there does not exist any pending SR, the UE executes the selection procedure as disclosed in Implementation 4, and performs scheduling request based on the selected scheduling request configuration. Optionally, the UE may perform scheduling request based on the scheduling request configured by the network side as disclosed in Implementations 1 to 3.

Implementation 6

Considering the low latency requirement of V2X service, the scheduling request configuration as disclosed in the above Implementations 1 to 5 may be used only in V2X service. For other services under the sidelink communication mode, the scheduling request may be completed by using only a random access method.

The specific method of implementation is disclosed in the following paragraphs.

When data arrive at a sidelink logical channel, if the sidelink logical channel is used for V2X services, then a V2X sidelink BSR is formed. The scheduling request triggered by the V2X sidelink BSR uses the corresponding scheduling request configuration as confirmed in the disclosed Implementations 1 to 5, and instructs the physical layer to send the scheduling request. If the sidelink logical channel is not used for V2X services, then a sidelink BSR is formed, the scheduling request triggered by the sidelink BSR triggers a random access procedure, and, optionally, the pending SR is canceled.

The specific method of implementation is disclosed in the following paragraphs.

When data arrive at a sidelink logical channel, a sidelink BSR is formed. The formed sidelink BSR triggers a scheduling request.

If the sidelink BSR is triggered by the logical channel related to V2X, or, in another word, the scheduling request is triggered by the logical channel related to V2X, the corresponding scheduling request configuration as confirmed in the disclosed Implementations 1 to 5 is used, and the physical layer is instructed to send the scheduling request.

If the sidelink BSR is not triggered by the logical channel related to V2X, or, in another word, the scheduling request is not triggered by the logical channel related to V2X, then a sidelink BSR is formed, the scheduling request triggered by the sidelink BSR triggers a random access procedure, and, optionally, the pending SR is canceled.

Figure 4:
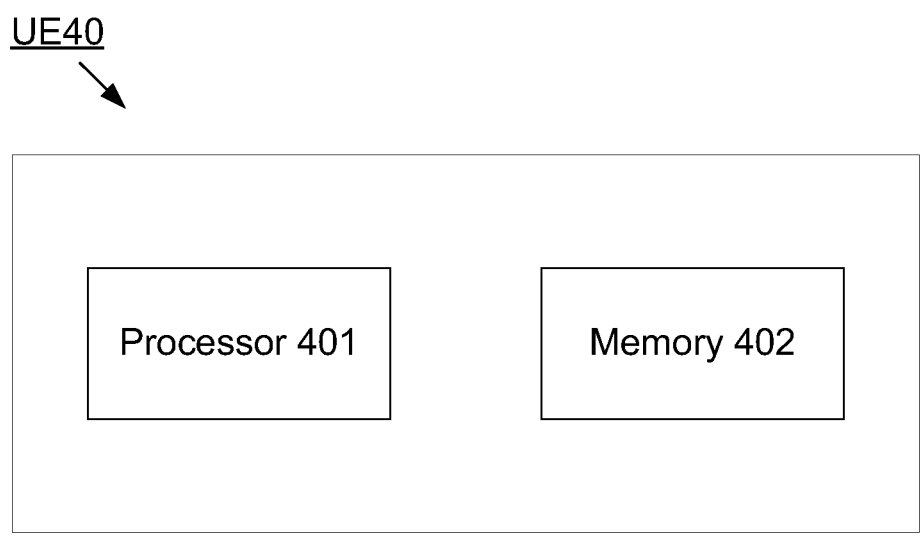
FIG. 4 is a block diagram of a user equipment 40 according to an implementation of the present disclosure.

Furthermore, FIG. 4 is a block diagram of a user equipment 40 according to an implementation of the present disclosure. As shown in FIG. 4, the user equipment 40 comprises a processor 401 and a memory 402. The processor 401, in one example, may comprise a microprocessor, a microcontroller, an embedded processor etc. The memory 402, in one example, may comprise volatile memory (e.g., random access memory RAM), a hard disk drive (HDD), non-volatile memory (e.g., flash memory), or any other memories. The memory 402 stores program instructions. The program instructions, when executed by the processor 401, cause the user equipment to carry out the control methods as disclosed herein.

According to the present disclosure, executing programs stored on equipment may be implemented by controlling a Central Processor Unit (CPU) and causing a computer to realize the program functions of the present disclosure. The program or the information being processed by the program may be stored in volatile memory (e.g., random access memory (RAM)), a hard disk drive (HDD), non-volatile memory (e.g., flash memory), or any other suitable memory system.

The program that realizes functions of each implementation in the present disclosure may be stored on a computer-readable medium. Computer systems through reading the programs stored in the storage medium executes the programs to realize the corresponding functions. The "computer system" disclosed herein may be a computer system embedded in equipment, may include an operating system or hardware (e.g., peripheral equipment). A "computer-readable medium" may be a semiconductor storage medium, optical storage medium, a magnetic storage medium, a storage medium for short-term dynamic storing of programs, or any other storage medium readable by a computer.

Various characteristics or function modules used in the equipment disclosed in the implementations herein may be realized or implemented by electronics such as a monolithic or multiple-chip integrated circuit. The electronics designed for implementing the functions disclosed herein may include general processors, a digital signal processor (DSP), Applications Specific Integrated Circuitry (ASIC), Field Programmable Gate Arrays (FPGAs) or any other programmable logic devices, discrete gate or transistor logic, discrete hardware assembly, or any combination of the disclosed devices. A general processor may be a microprocessor, or any present processor, controller, microcontroller, or state machine. The disclosed electronics may be digital electronics or analog electronics. As semiconductor technology continues to improve, it is noted that there may be new integrated circuit technology replacing present integrated circuits, one or more implementations of the present disclosure may be implemented with the new integrated circuit technology.

Moreover, the present disclosure is not limited to the disclosed implementations. Although various examples are disclosed in each implementation, it should be noted that the present disclosure is not limited thereto. Fixed or non-mobile electronic equipment installed indoor or outdoor may be in a form of terminal equipment or communications equipment. For example, the electronic equipment may be Audio-Video equipment, kitchen equipment, cleaning equipment, air-conditioner, office equipment, vending machines, and other home appliances etc.

As above, the implementations of the present disclosure are disclosed in detail with reference to the accompanying drawings. However, the implementations are not limited to the disclosed implementations. The present disclosure also includes design variations without departing from the scope or spirit of the disclosed concepts. Furthermore, the present disclosure also encompasses modifications within the scope of the claims, implementations suitably combining various disclosed implementations. Additionally, the disclosed implementations may have component substitutions that have similar effect.

What is claimed is:

1. A control method for a user equipment, the control method comprising:
   receiving scheduling request configuration information related to a sidelink;
   selecting a scheduling request configuration for a scheduling request related to the sidelink according to at least one of a plurality of criteria based on the received scheduling request configuration information; and
   performing the scheduling request related to the sidelink based on the selected scheduling request configuration, wherein:
   the scheduling request configuration information is received from a base station and comprises a scheduling request configuration identity (ID) and a specific scheduling request configuration,
   the specific scheduling request configuration comprises one or more scheduling request configurations, and each scheduling request configuration comprises a maximum allowable number of times for sending the scheduling request, a time during which sending the scheduling request is prohibited, scheduling request periodicity and offset information, PUCCH resource information, and bandwidth part (BWP) related information, and
   the plurality of criteria comprises:
      the selected scheduling request configuration being corresponding to a scheduling request prohibit timer that is not active or running,
      the selected scheduling request configuration being corresponding to valid Physical Uplink Control Channel (PUCCH) resources, and
      the selected scheduling request configuration being corresponding to a logical channel priority that is equivalent to a sidelink logical channel priority.

2. A user equipment, comprising:
   at least one processor; and
   at least one memory coupled to the at least one processor and storing one or more instructions,
   wherein the one or more instructions, when executed by the at least one processor, cause the at least one processor to perform the control method according to claim 1.

3. The control method according to claim 1, wherein:
   the scheduling request configuration information comprises the scheduling request configuration ID, and
   the scheduling request configuration ID is a scheduling request procedure configuration information ID or a scheduling request resource configuration information ID.

4. A user equipment, comprising:
   at least one processor; and
   at least one memory coupled to the at least one processor and storing one or more instructions,
   wherein the one or more instructions, when executed by the at least one processor, cause the at least one processor to perform the control method according to claim 3.

5. The control method according to claim 2, wherein:
   when the scheduling request configuration ID is the scheduling request procedure configuration information ID, the scheduling request configuration information further comprises the maximum allowable number of times for sending the scheduling request and the time during which sending the scheduling request is prohibited, and
   when the scheduling request configuration ID is the scheduling request resource configuration information ID, the scheduling request configuration information further comprises the maximum allowable number of times for sending the scheduling request, the time during which sending the scheduling request is prohibited, the scheduling request periodicity and offset information, and the PUCCH resource information.

6. A user equipment, comprising:
   at least one processor; and
   at least one memory coupled to the at least one processor and storing one or more instructions,
   wherein the one or more instructions, when executed by the at least one processor, cause the at least one processor to perform the control method according to claim 5.

7. The control method according to claim 1, wherein the scheduling request configuration information corresponds to each of a plurality of sidelink logical channel groups, or the scheduling request configuration information is provided according to each of a plurality of priorities included in a corresponding sidelink logical channel group.

8. A user equipment, comprising:
   at least one processor, and
   at least one memory coupled to the at least one processor and storing one or more instructions,
   wherein the one or more instructions, when executed by the at least one processor, cause the at least one processor to perform the control method according to claim 7.

9. The control method according to claim 1, further comprising:
   applying the selected scheduling request configuration, which is selected based on the scheduling request configuration information, to vehicle-to-everything (V2X) services when the V2X services exist; and
   using random access to perform another scheduling request for other services in a sidelink communication mode.

10. A user equipment, comprising:
    at least one processor; and
    at least one memory coupled to the at least one processor and storing one or more instructions,
    wherein the one or more instructions, when executed by the at least one processor, cause the at least one processor to perform the control method according to claim 9.

11. The control method according to claim 1, further comprising:
    cancelling the scheduling request when the scheduling request is triggered, or prior to the scheduling request being triggered, if there is a pending scheduling request, wherein
    selecting the scheduling request configuration comprises selecting the scheduling request configuration if there is no pending scheduling request.

12. A user equipment, comprising:
    at least one processor, and
    at least one memory coupled to the at least one processor and storing one or more instructions,
    wherein the one or more instructions, when executed by the at least one processor, cause the at least one processor to perform the control method according to claim 11.

* * * * *